Aug. 23, 1927.

W. C. RICE 1,639,899

DUSTPAN

Filed April 14, 1925

Inventor

W. C. Rice

By C. A. Snow & Co.

Attorneys

Patented Aug. 23, 1927.

1,639,899

UNITED STATES PATENT OFFICE.

WILLIAM C. RICE, OF HOLDEN, MISSOURI.

DUSTPAN.

Application filed April 14, 1925. Serial No. 23,066.

This invention relates to household utensils and more particularly to dust pans.

The object of the invention is to so construct a dust pan that the front edge thereof may be lowered and tightly rest on the floor without being held by the user.

Another object is to so construct a pan of this character that when lowered into engagement with the floor the front edge will tightly rest on the floor of its own weight and which is equipped with a handle so mounted that when lifted the pan will tip backward and securely retain the contents.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

In the embodiment illustrated the dust pan 1 is shown substantially rectangular in form as is usual with devices of this character and has an upstanding flange 2 around its side and rear edges, a handle 3 being shown riveted to the outer face of the rear flange.

Figure 1:
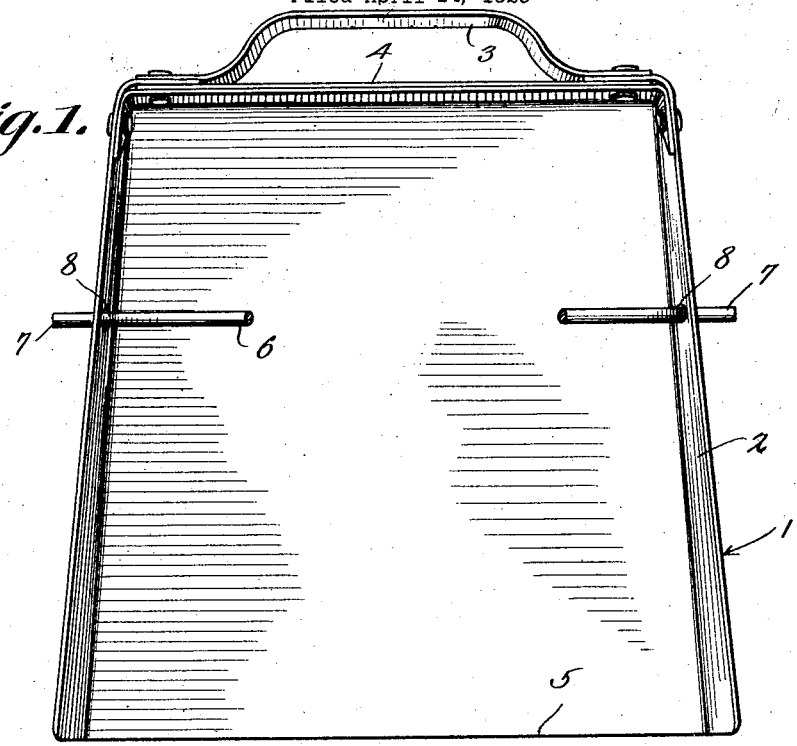
Figure 1 represents a top plan view of a pan constructed in accordance with this invention, the handle being broken off and in section.
Figure 2:
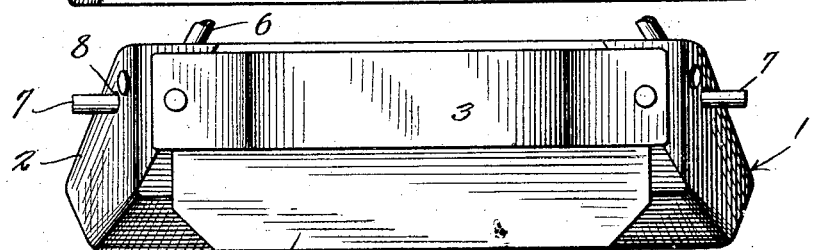
Fig. 2 is a rear elevation thereof.
Figure 3:
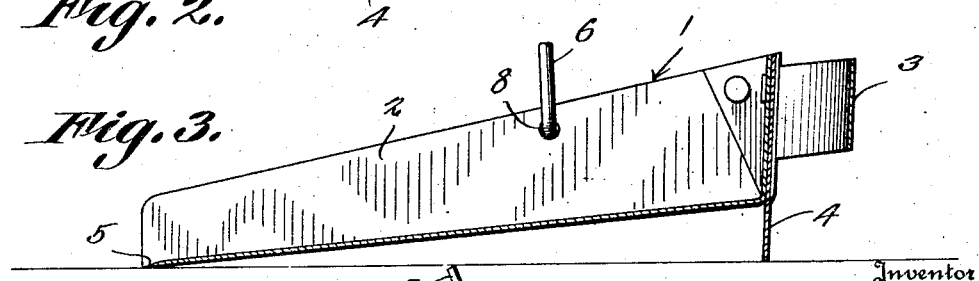
Fig. 3 is a longitudinal section with the handle broken off.
Figure 4:
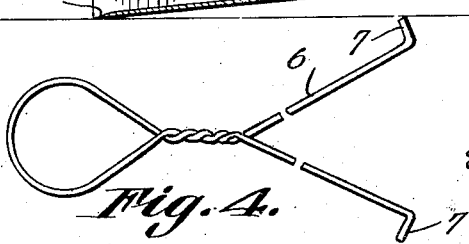
Fig. 4 is a plan view of the handle detached, parts being broken out for convenience in illustration.

A rear support 4 in the form of a metal strip is secured to the upright rear flange of the pan and extends below the bottom thereof as is shown clearly in Figs. 2 and 3. This support 4 is designed to hold the rear end of the pan elevated with the front end inclined downwardly toward the floor, said front end or edge being preferably beveled as shown at 5 to adapt it to fit tightly against the floor, the weight of the pan operating to so hold it.

A wire handle 6 is pivotally connected with the side flanges 2 of the pan at a point in rear of the transverse median line and operates when the pan is lifted thereby to cause the tilting thereof so that the contents of the pan will pass toward the rear and be held securely against falling out.

From the above description it will be obvious that a pan constructed as herein shown and described may be positioned with its front edge tightly engaging the floor without being held by the user and which may be raised and lifted without necessitating the user bending to the floor.

The wire handle 6 having laterally extending outturned fingers 7 which are designed to enter the side walls of flanges of the pan through the apertures 8 therein may be readily disengaged from the pan when not desired to use it.

I claim:—

A dust pan including a body portion formed of a length of sheet metal, side and rear upstanding flanges formed on the body portion, the ends of the side flanges overlapping the ends of the rear flange, a support embodying a plate having its upper edge disposed between the overlapping ends and having its lower edge arranged in spaced relation with the body portion of the pan to elevate the rear end of the body portion, a handle positioned on the rear flange, rivets extending through the ends of the flanges, support and handle for securing the flanges in upright positions.

In testimony that I claim the foregoing as my own, I have hereto affixed my signature.

WILLIAM C. RICE.